US005718487A

United States Patent [19]
Roselli et al.

[11] Patent Number: 5,718,487
[45] Date of Patent: Feb. 17, 1998

[54] BRAKE CONTROL SYSTEM FOR DOUBLED ENDED LOCOMOTIVE

[75] Inventors: Leonard Roselli, Murrysville; Michael J. Joyce, Jr., Jefferson Borough; Gregory S. Balukin, Pittsburgh, all of Pa.

[73] Assignee: Westinghouse Air Brake Company, Wilmerding, Pa.

[21] Appl. No.: 589,085

[22] Filed: Jan. 23, 1996

[51] Int. Cl.⁶ ................................................. B60T 11/20
[52] U.S. Cl. ........................... 303/14; 303/15; 303/132
[58] Field of Search ........................ 303/7, 9, 9.61, 303/9.63, 140, 117, 128, 131, 132, 135, 20, 3, 15; 364/424.024, 426.05

[56] References Cited

U.S. PATENT DOCUMENTS

| 5,192,118 | 3/1993 | Balukin et al. | 303/15 |
|---|---|---|---|
| 5,222,788 | 6/1993 | Dimsa et al. | 303/15 |
| 5,249,125 | 9/1993 | Root et al. | 303/15 X |
| 5,383,717 | 1/1995 | Fernandez et al. | 303/3 |
| 5,385,392 | 1/1995 | Ferri | 303/3 X |
| 5,415,465 | 5/1995 | Skantar et al. | 303/3 |
| 5,538,331 | 7/1996 | Kettle, Jr. | 303/15 |

*Primary Examiner*—Josie Ballato
*Attorney, Agent, or Firm*—James Ray & Associates

[57] ABSTRACT

A system for electronically controlling brakes on a train through a double ended locomotive is disclosed. The electronic brake control system comprises a first cab station, a second cab station and a brake control device which communicates with each of the cab stations. The cab stations are interchangeable and operate in part according to algorithms set forth in software written for the instant cab stations. The brake control device likewise operates in part according to algorithms set forth in software written for the brake control device. The first cab station generates a first stream of signal packets indicative of parameters for operating the system and transmits same to the brake control device. The second cab station likewise generates a second stream of signal packets indicative of parameters for operating the system and transmits same to the brake control device. Each cab station generates and transmits its respective stream of signal packets one signal packet at a time. From these signal packets, the brake control device determines which of the cab stations will direct control of the train brakes according to basic rules set forth in the software. When the brake control device selects one of said cab stations to direct control of the brakes, the brake control device controls operation of the brakes in response to at least the stream of signal packets corresponding to the selected cab station.

20 Claims, 8 Drawing Sheets

BRAKE CONTROL SYSTEM FOR DOUBLED ENDED LOCOMOTIVE

FIELD OF THE INVENTION

The present invention generally relates to a system for electronically controlling brakes on a train and, more particularly, is concerned with a system for electronically controlling brakes on train having a double ended locomotive.

BACKGROUND OF THE INVENTION

Since the advent of solid state electronics, manufacturers of railroad transportation technology have sought to convert locomotive control systems from conventional mechanical apparatus to more modern electronic componentry. Part of the rationale for preferring electronic systems over their mechanical counterparts involves factors that one typically associates with computerization. Faster control of various systems and elimination of bulky mechanical hardware to decrease weight and increase available space are two such factors. Reliability and greater operational efficiency are prime examples of two other such factors. Market forces including the need to keep up with business competitors are also important factors for companies engaged in the development of computerized locomotive control systems.

Electronic locomotive control systems of varying sophistication and complexity have been developed in recent years. The electronics within these control systems perform the basic functions requisite to the control of a locomotive more efficiently than the old mechanical relay based systems of years past. Computerized locomotive control systems now control engine propulsion, dynamic braking and pneumatic braking to name a few such functions. These electronic control systems may also be interconnected with other systems such as wheel slip and slide detection circuitry. Such features further enhance the performance of locomotives and make such computerized systems even more attractive to customers of railroad equipment manufacturers.

These advances in railroad transportation technology have served to accelerate further the drive toward development of ever more powerful computer controlled systems. Customers of railroad equipment manufacturers such as freight and passenger transit services sometimes require an entirely new control system to be developed for a particular type of locomotive. More often, customers require an existing control system to be improved in some substantial way. Sometimes an existing control system must be modified to perform existing functions in an significantly different manner. Other times an existing control system must be modified either to include, or to interact with, new or modified subsystem hardware or to perform novel functions or both. The present doubled ended locomotive brake control system is one such computer controlled system.

A typical train consist includes at least one locomotive, one or more rail vehicles and a plurality of trainlines. The trainlines include both pneumatic and electrical lines which generally run from a head of train locomotive to a last rail vehicle in the train and connect to air brakes and electrical devices, respectively, in each of the rail vehicles. In a locomotive, the pneumatic trainlines include an actuating pipe, a main reservoir equalizing (MER) pipe, and an independent application and release (IAR) pipe. Within a locomotive consist (i.e., two or more locomotives interconnected), each of the MER, actuating and IAR pipes respectively interconnect with the MER, actuating and IAR pipes of the other locomotives. The pneumatic trainlines also include a brake pipe whose pressure mimics pressure within a storage tank called an equalization reservoir. The brake pipe consists of a series of pipe lengths. Usually secured to the underside of each rail vehicle, each pipe length is interconnected to another such pipe length via a flexible coupler situated between each rail vehicle. Connected to the equalization reservoir, the brake pipe is thus one long continuous pipe running from the head of train locomotive to the last rail vehicle.

Sometimes referred to in the singular as a trainline or a trainline cable, the electrical trainlines (i.e., wires) include a power line, a ground line and various control lines which, along with other electrical lines, are contained within a protective conduit or cable. As with the brake pipe, the electrical trainlines actually constitute a series of individual conduits. Usually secured to the underside of each rail vehicle, each individual conduit is interconnected to another individual conduit via a connector situated between each rail vehicle to form the electrical trainline of the train consist.

A typical single ended locomotive has an electronic brake control system such as WABCO EPIC® Brake Equipment as shown and described in U.S. Pat. Nos. 5,192,118 and 5,222,788 and incorporated herein by reference. Such brake control systems generally include a brake control unit for controlling operation of the brakes; a cab station unit for providing various inputs including automatic and independent brake handle positions to the brake control unit as alluded to hereinafter; a keyboard for accessing the brake equipment including providing certain set-up parameters as indicated below; a display for monitoring brake equipment operation; a locomotive interface unit for connecting both electrical power and the trainlines to the brake equipment; and a pneumatic operating unit having solenoid valves for controlling pressures in the pneumatic trainlines and in the reservoirs so as to control the brakes according to commands received from the brake control unit.

Referring still to the elements of the typical single ended locomotive, the cab station unit generally includes an independent brake handle, an automatic brake handle, and a cab control unit. The cab control unit has a cab CPU board and a cab input/output (I/O) card which links the handles to the cab CPU board. Depending upon the particular brake control system, the handles and the rest of the cab station unit may be configured either as part of the same unit or as separate units. Through the independent brake handle, a train operator may apply and release the brakes on each locomotive. Through the automatic brake handle, however, the train operator may apply and release the brakes not only on each locomotive but also on each rail vehicle. The rate at which the brake equipment reduces or increases pressure within the brake pipe, and thus the amount of braking power exerted by the train brakes, generally corresponds to the position of the automatic brake handle.

The cab control unit provides to the brake control unit signals representing the positions of the automatic and independent brake handles. The automatic brake handle may be moved to and between any of the positions described generally as follows. From a release position at one extreme in which brake pipe pressure is maximum and the brakes are completely released to an emergency position at another extreme in which brake pipe pressure is zero and the brakes are fully applied, the brake pipe may assume any pressure level in between. When the automatic brake handle is moved to the release position, the brake equipment increases pressure within the equalization reservoir and thus the brake pipe and correspondingly reduces pressure within the brake cylinders so as to release completely the train brakes. In the minimum service position, the brake equipment reduces pressure slightly in the equalization reservoir and thus the brake pipe so as to prepare the system for somewhat quicker application of the train brakes than would be possible from the release position. In the full service position, the brake equipment further reduces pressure within the equalization reservoir and thus the brake pipe and correspondingly increases pressure within the brake cylinders so as to apply fully the train brakes. Moving the automatic brake handle into the suppression position does not further reduce pressure within the brake pipe but overrides certain safety and speed controls. In the continuous service position, the brake equipment reduces the equalization reservoir pressure to zero at a preset service rate of reduction. When the automatic brake handle is moved back into a service zone situated between the minimum and full service positions, the brake equipment generally holds pressure within the brake pipe at the existing pressure. In the emergency position, the brake equipment exhausts brake pipe pressure to atmosphere through two emergency magnet valves at an emergency rate so as to apply quickly and fully the train brakes.

Likewise, the independent brake handle may be moved in between and placed within any of two positions. When the independent brake handle is moved to the release position, the brake equipment reduces pressure within the IAR pipe and correspondingly reduces pressure in the brake cylinders of the locomotive so as to release completely the locomotive brakes. Similarly, when the independent brake handle is moved to the apply position, the brake equipment increases pressure within the IAR pipe and correspondingly increases pressure in the brake cylinders of the locomotive so as to apply fully the locomotive brakes. Pressure within the IAR pipe and the locomotive brake cylinders reduces and increases in relation to the position of the independent brake handle.

Referring still to the elements of the typical single ended locomotive, the keyboard generally includes several keys each of which is dedicated to one or more functions. In certain versions of WABCO EPIC® Brake Equipment, the keyboard includes seven keys for inputting certain parameters necessary to set-up the brake equipment for operation. For example, the train operator may select whether the train is to be operated as a passenger train or as a freight train. Likewise, the train operator may select a feedvalve setting appropriate to the rail vehicles in the train consist. This feedvalve setting represents the maximum pressure to which the brake pipe may be charged by the brake equipment.

Through these keys, the train operator also selects the mode in which the brake equipment operates the train. In a LEAD CUT-IN mode, the brake equipment allows the train operator to direct control of the train through both the automatic and the independent brake handles. This gives the train operator control over the brakes of both the locomotive (s) and the rail vehicles. In a LEAD CUT-OUT mode, the brake equipment allows the train operator to direct control of the train only through the independent brake handle. This gives the train operator control over the brakes of the locomotive(s) only. In a TRAIL mode, both of the automatic and independent brake handles are rendered inoperable except for the emergency position. In a locomotive consist, the brake equipment of one locomotive operating in the TRAIL mode is subservient to the brake equipment of another locomotive operating in either of the LEAD modes. The brake equipment of a single ended locomotive assumes the previous mode of operation at system start up whereas that of a typical double ended locomotive defaults to the TRAIL mode of operation.

The cab control unit of the type found within WABCO EPIC® Brake Equipment and other brake control systems converts analog electrical signals representing the positions of the automatic and independent brake handles into digital code and transmits such codes to the brake control unit for use in controlling the train brakes. Similarly, the cab control unit also transmits to the brake control unit signals indicative of the other operating parameters set forth above. The cab control unit continuously transmits such information to the brake control unit in a stream of signal packets along a communications (hereinafter "comm") channel. Each signal packet generally consists of a series of bytes which collectively represent the various input parameters used to control the brake system. For example, in WABCO EPIC® Brake Equipment, the cab control unit sends to the brake control unit in a typical signal packet: four bytes representing the positions of the automatic (two bytes) and independent (two bytes) brake handles; two bytes representing the feedvalve setting; one byte representing the number of locomotives in the locomotive consist; and one or more status bytes. The status bytes include at least one bit for the emergency position of the automatic brake handle and various other bits representing various penalty inputs and other operating conditions.

The status bytes also include current mode bits and request mode bits. The current mode bits indicate the mode in which the cab control unit is set and in which the system is currently operating. Occupying the same position in the status bytes as the current mode bits, the request mode bits indicate a request for a change in the operating mode. While the brake equipment is operating in any given mode, the cab control unit sends to the brake control unit within each signal packet the current mode bits. When a change in mode is requested via the keyboard, the cab control unit transmits to the brake control unit within the signal packet the request mode bits. The brake control unit grants or denies such requests based on criteria set forth in the system software. Based on the signal packets received via the comm channel and on various other inputs, the brake control unit controls the operation of the brakes.

Referring still to the elements of the typical single ended locomotive and the brake equipment therein, the brake control unit includes a brake CPU board and one or more brake I/O cards each interconnected to the brake CPU board via a standard port. Through the brake I/O cards, the brake CPU board receives various inputs from, and transmits various outputs to, both the locomotive interface unit and the pneumatic operating unit as alluded to previously. The brake control unit receives the signal packets from the cab control unit via the comm channel. In WABCO EPIC® Brake Equipment for example, the CPU boards of the brake and cab control units each contain at least one RS-232 or like communications port. In particular, a first comm port on the cab CPU board, a second comm port on the brake CPU board and a channel connected therebetween constitutes the comm channel. Before transmitting each signal packet to the brake control unit, the cab control unit takes approximately 100 milliseconds to perform the operations necessary to create and send each signal packet. This includes scanning the handle positions, reading certain other input parameters, converting the analog signals to digital form and forming each signal packet. Similarly, through the brake CPU board and the brake I/O cards, the brake control unit takes approximately 70 milliseconds to perform its operations during its standard control loop. This includes reading input from various pressure sensors such as a brake pipe sensor, an equalization reservoir sensor, and a brake cylinder sensor;

decoding each signal packet received; and controlling various magnet valves such as a brake application magnet valve and a brake release magnet valve. The brake control unit also responds to various penalty inputs such as an alterer penalty, an overspeed penalty, communication loss penalties and power loss penalties. The brake control unit of the typical single ended locomotive brake control system does not, however, communicate any information to the cab control unit.

The instant invention is designed for a double ended locomotive not the single ended locomotive as generally described above. A typical double ended locomotive is equipped with a coupler situated at either end to which a rail vehicle may be coupled. It is designed to haul rail vehicles in either direction along railway tracks and need not itself be turned around at the end of any given rail line. Whereas the typical single ended locomotive has one control stand and associated brake control equipment for controlling the train brakes, the typical double ended locomotive generally has two such control stands, one of which at each end. From either control stand, the train operator directs control of the train brakes through whatever type of brake equipment is disposed on the typical double ended locomotive.

The instant invention is an electronically controlled brake control system intended for use with a double ended locomotive and associated rail vehicles. It constitutes a significant advance over the brake control equipment currently found on the typical double ended locomotive. As set forth more fully in the following detailed description, the present invention operates more efficiently and reliably than prior double ended locomotive brake control systems. Though the instant electronic brake control system is primarily intended for use with a double ended locomotive, it should be apparent to persons skilled in the brake control system art that certain aspects of the instant invention could also be applied to single ended locomotive applications, though obvious modifications may be necessary.

It should be noted that the foregoing background information is provided to assist the reader in understanding the instant invention and any terms of art used herein are not intended to be limited to any specific meaning unless specifically stated otherwise in this specification including the following detailed description.

SUMMARY OF THE INVENTION

In a presently preferred embodiment, the present invention provides a system for electronically controlling brakes on a train through a double ended locomotive. The electronic brake control system includes a first cab station, a second cab station and a brake control device which communicates with each of the cab stations. The cab stations are interchangeable and operate in part according to algorithms set forth in software written for the instant cab stations. The brake control device likewise operates in part according to algorithms set forth in software written for the brake control device. The first cab station generates a first stream of signal packets indicative of parameters for operating the system and transmits same to the brake control device. The second cab station likewise generates a second stream of signal packets indicative of parameters for operating the system and transmits same to the brake control device. Each cab station generates and transmits its respective stream of signal packets one signal packet at a time. From these signal packets, the brake control device determines which of the cab stations will direct control of the train brakes according to basic rules set forth in the software. When the brake control device selects one of said cab stations to direct control of the brakes, the brake control device controls operation of the brakes in response to at least the stream of signal packets corresponding to the selected cab station.

The present invention also provides a cab control unit for use as part of a brake control system for a double ended locomotive. The cab control unit includes a cab I/O card and a cab CPU board. The cab I/O card receives electrical signals indicative of the positions of an automatic brake handle and an independent brake handle as well as electrical signals indicative of requests for a LEAD CUT-IN, a LEAD CUT-OUT and a TRAIL mode of operation for the brake control system. The cab CPU board generates a stream of signal packets at least in part from the electrical signals received by the cab I/O card. The cab CPU board communicates the stream of signal packets to a means for controlling the brakes. The cab CPU board also receives and processes commands from the brake control means pertaining to whether the request for a change in mode is either granted or denied.

The present invention further provides a brake control unit for use as part of a brake control system for a double ended locomotive. The brake control unit includes a brake CPU board and at least one brake I/O card which connects to the brake CPU board. The brake CPU board interconnects to a pair of cab control units each of which generates a stream of signal packets. Each stream of signal packets is at least indicative of the positions of an automatic brake handle and an independent brake handle as well as requests for a LEAD CUT-IN, a LEAD CUT-OUT and a TRAIL mode of operation for the brake control system. The brake CPU board determines which of the streams of signal packets will be used to direct control of the brakes. The brake CPU board also controls operation of the brakes through the brake I/O card(s) in response to at least the stream of signal packets so selected.

OBJECTIVE OF THE INVENTION

It is, therefore, a primary objective of the present invention to provide a system for electronically controlling brakes on train having a double ended locomotive.

Another objective of the present invention is to provide an electronic brake control system for a double ended locomotive that intelligibly creates, selects and processes multiple inputs from two cab station units so as to control the train brakes faster, more efficiently and more reliably than prior art double ended locomotive brake control systems.

Yet another objective of the present invention is to provide an electronic brake control system for a double ended locomotive wherein integral to each of two cab station units there is both a handle unit housing automatic and independent brake handles through which control of the brakes is directed and a set-up unit housing switches through which various modes of operation for the instant system may be selected.

Still another objective of the present invention is to provide an electronic brake control system for a double ended locomotive wherein communication enhancing circuitry is disposed within each of two cab station units and a brake control unit so as to improve quality of communication between the cab station units and the brake control unit in certain operating environments.

Even another objective of the present invention is to provide an electronic brake control system for a double ended locomotive having two cab station units wherein each cab station unit is interchangeable with the other.

A further objective of the present invention is to provide an electronic brake control system for a double ended locomotive which includes two cab station units and a brake control unit such that if one cab station unit through which control of the brakes is being directed should fail, the brake control unit automatically enables the other cab station unit to direct control of the brakes.

In addition to the objectives and advantages of the present invention set forth above, various other objectives and advantages of the instant invention will become readily apparent to those persons who are skilled in the brake control system art from a reading of the detailed description section of this document. The other objectives and advantages will become particularly apparent when such description is taken in conjunction with the attached drawing(s) and with the appended claims.

DETAILED DESCRIPTION OF THE INVENTION

Figure 1:
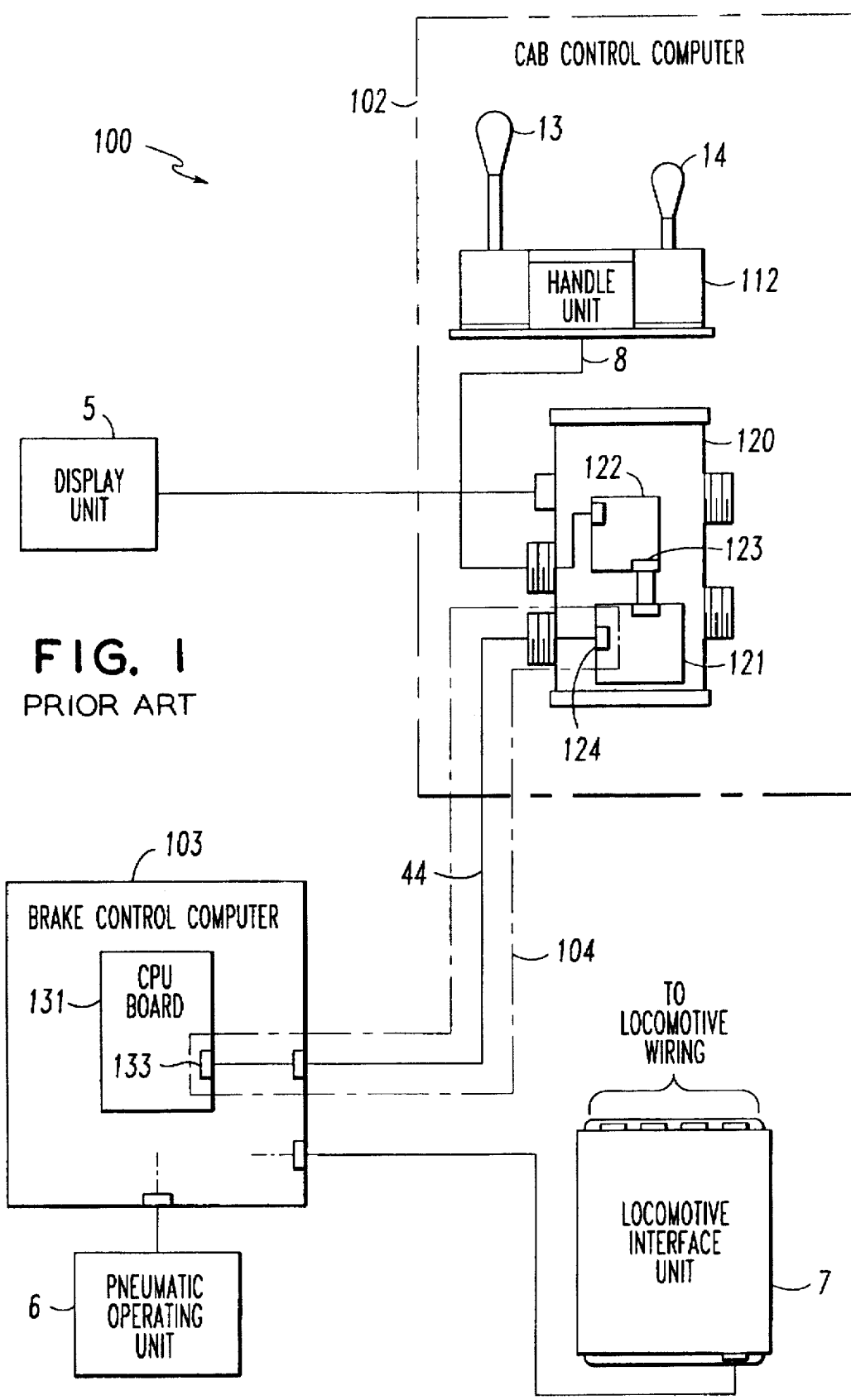
FIG. 1 is a schematic block diagram of a prior art electronic brake control system for a single ended locomotive.

Before describing the present invention, in detail, the reader is advised that for the sake of clarity and understanding identical components having identical functions in each of the accompanying drawings have been marked with the same reference numerals throughout each of the several Figures illustrated herein.

FIG. 1 illustrates the essential details of the prior art electronic brake control system for a single ended locomotive. Generally designated 100, the prior art system includes, as generally described previously, a cab station unit 102, a brake control unit 103 and a comm channel 104. The prior art system 100 also includes a display 5, a pneumatic operating unit 6 and a locomotive interface unit 7 whose basic operations within the prior art system 100 have been described previously. Such cab station unit 102 includes a handle unit 112 and a cab control unit 120. Handle unit 112 has an automatic brake handle 13 and an independent brake handle 14. Handle unit 112 generates an electrical signal corresponding to the position of automatic brake handle 13 and an electrical signal corresponding to the position of independent brake handle 14. One of the positions into which automatic brake handle 13 can be moved is the emergency position as described above.

Cab control unit 120 of FIG. 1 has a cab CPU board 121 including a first comm port 124 and a cab I/O card 122 including a base port 123. As generally explained previously, the prior art cab control unit 120 is programmed to execute a standard control loop of approximately 100 milliseconds duration in which it performs, among other functions, the various operations necessary to create and send each signal packet. During this cab control loop, cab I/O card 122 receives from handle unit 112 through a cable 8 the electrical signals representing the positions of the automatic and independent brake handles 13,14 and converts them into digital code. Cab I/O card 122 sends the digital code via base port 123 to cab CPU board 121. Cab control unit 120 also receives and converts input signals representing other operating parameters (not shown) for use in generating the stream of signal packets. These input signals include the requests for LEAD CUT-IN, LEAD CUT-OUT and TRAIL mode of operation as received from a keyboard (not shown) as set forth above. In each control loop, cab CPU board 121 generates, from these converted input signals, one signal packet indicative of these operating parameters including the positions of the automatic and independent brake handles 13,14. Through first comm port 124, cab CPU board 121 communicates these signal packets, one for each control cycle, to brake control unit 103 in the stream of signal packets.

Referring still to the prior art single ended locomotive brake control system 100 illustrated in FIG. 1, brake control unit 103 has a brake CPU board 131 including a second comm port 133 and at least one brake I/O card (not shown). From first comm port 124 through channel 44 to second comm port 133, brake CPU board 131 receives the stream of signal packets. Through the brake I/O cards, various other inputs of system 100 previously set forth are also conveyed to brake CPU board 131. As generally explained previously, the prior art brake control unit 103 is programmed to execute a standard control loop of approximately 70 milliseconds duration in which it performs, among other functions, the various operations necessary to control operation of the train brakes including decoding each signal packet received from cab control unit 120 and acting thereon.

Figure 2:
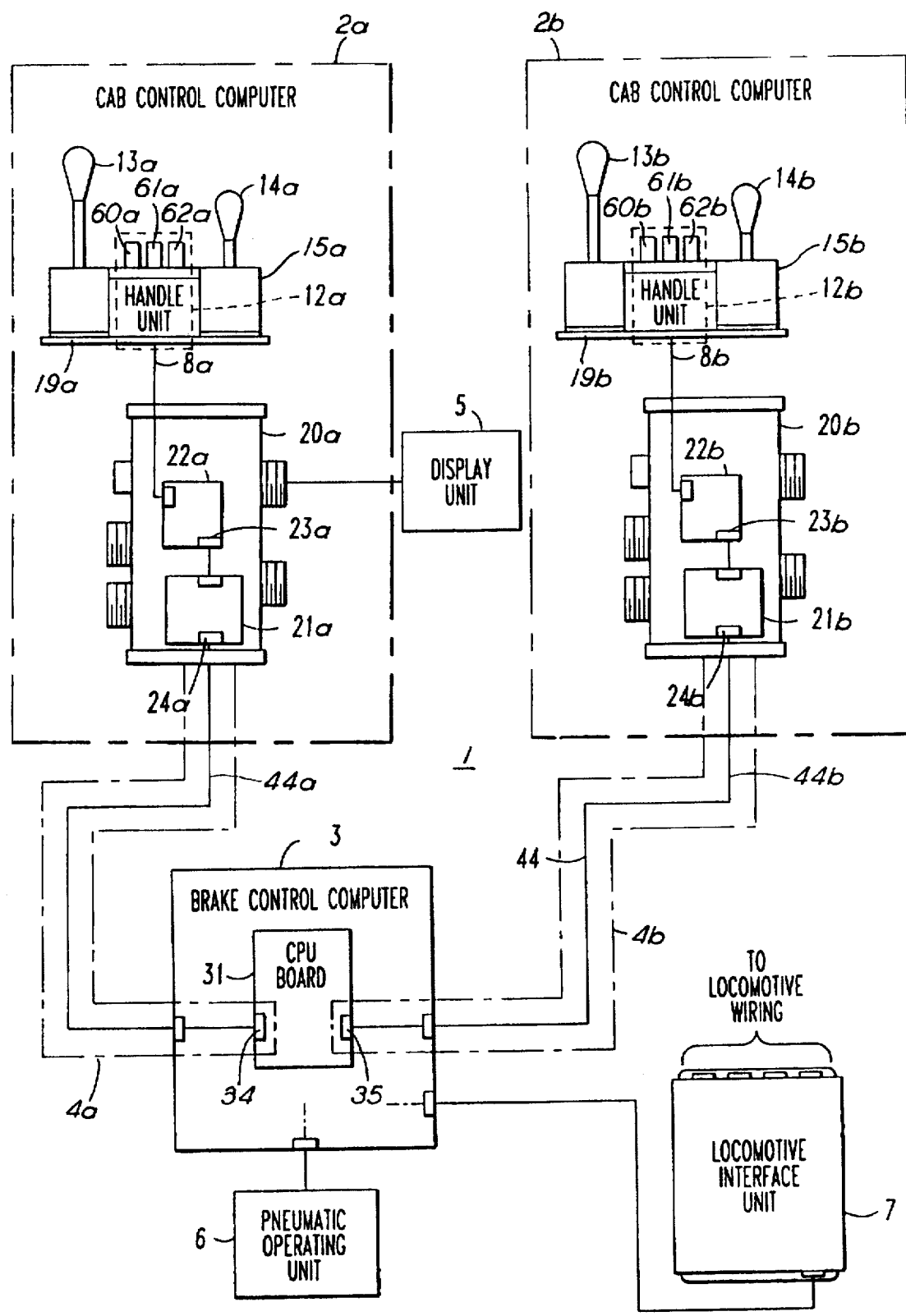
FIG. 2 is a schematic block diagram of the instant electronic brake control system for a double ended locomotive.
Figure 3:
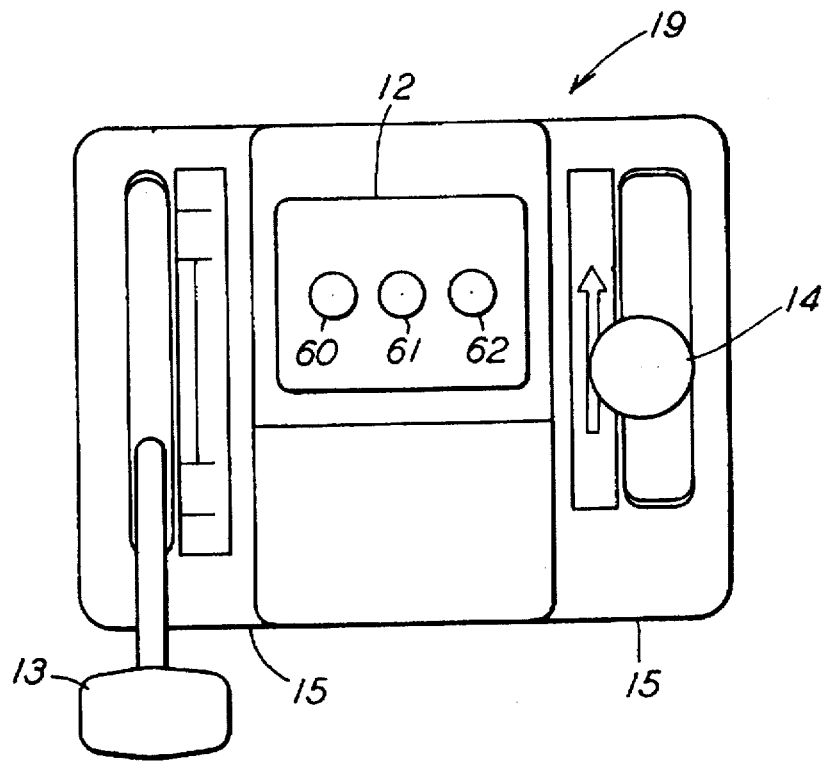
FIG. 3 is an enlarged overhead view of a cab station unit including both a handle unit and a set-up unit integral thereto showing the automatic and independent brake handles of the handle unit and the LEAD CUT-IN, LEAD CUT-OUT and TRAIL mode switches of the set-up unit.

FIGS. 2 and 3 illustrate the essential details of the instant electronic brake control system, generally designated 1, for a double ended locomotive. The presently preferred embodiment of the present invention 1 includes a first cab station unit 2a, a second cab station unit 2b, a brake control unit 3 and comm channels 4a and 4b connecting brake control unit 3 to cab station units 2a, 2b, respectively. The instant brake control system 1 also includes a display 5, a pneumatic operating unit 6 and a locomotive interface unit 7 whose basic operations within the present system 1 have been described previously.

First cab station unit 2a is essentially identical to second cab station unit 2b. First cab station unit 2a includes a first set-up unit 12a, a first handle unit 15a and a first cab control unit 20a. Second cab station unit 2b includes a second set-up unit 12b, a second handle unit 15b and a second cab control unit 20b. Unlike with the prior art single ended locomotive brake control system 100 of FIG. 1, first setup unit 12a and first handle unit 15a are one integral component 19a. Second setup unit 12b and second handle unit 15b are likewise one integral component 19b. As best illustrated in FIG. 3, each set-up unit 12a,12b includes a LEAD CUT-IN switch 60a, 60b, a LEAD CUT-OUT switch 61a,61b and a TRAIL switch 62a,62b. When one of the LEAD CUT-IN switches 60a,60b is pressed, the set-up unit 12a,12b to which it corresponds generates an electrical signal representing a request for a LEAD CUT-IN mode of operation. When one of the LEAD CUT-OUT switches 61a,61b is pressed, the set-up unit 12a,12b to which it corresponds generates an electrical signal representing a request for a LEAD CUT-OUT mode of operation. Likewise, when one of the TRAIL switches 62a,62b is pressed, the set-up unit 12a,12b to which it corresponds generates an electrical signal representing a request for a TRAIL mode of operation.

Each handle unit 15a,15b of the cab station units 2a,2b includes an automatic brake handle 13a,13b and an independent brake handle 14a,14b, as best illustrated in FIG. 3. When one of the automatic brake handles 13a,13b is moved, the handle unit 15a,15b to which it corresponds generates an electrical signal representing its position along a range of movement of the automatic brake handle 13a,13b as described previously. Likewise, when one of the independent brake handles 14a,14b is moved, the handle unit 15a,15b to which it corresponds generates an electrical signal representing its position along a range of movement of the independent brake handle 14a,14b as described previously.

Each automatic brake handle 13a,13b has an emergency position (not shown) and a cam switch (not shown) situated thereabout. If either automatic brake handle 13a,13b is moved to its emergency position, the present system 1 responds in two ways. First, brake control unit 3 energizes a first emergency magnet valve (not shown). When energized, the first emergency magnet valve supplies pressure to open an emergency vent valve (not shown). Second, the cam switch closes and power flows therethrough to energize a second emergency magnet valve (not shown). When energized, the second emergency magnet valve also supplies pressure to open the emergency vent valve. When opened, the emergency vent valve exhausts pressure from the brake pipe at an emergency rate to atmosphere so that the train brakes apply quickly and fully.

Cab control units 20a,20b of cab station units 2a,2b, respectively, are interchangeable in the instant system 1. Shown in FIG. 2, first cab control unit 20a has a first I/O card 22a and a first CPU board 21a. First I/O card 22a includes a first base port 23a and first CPU board 21a includes a first comm port 24a. Likewise, second cab control unit 20b has a second I/O card 22b and a second CPU board 21b. Second I/O card 22b includes a second base port 23b and second CPU board 21b includes a second comm port 24b. First and second comm ports 24a,24b are preferably asynchronous RS-232 serial ports. First cab I/O card 22a receives the electrical signals from both first set-up unit 12a and first handle unit 15a. Second cab I/O card 22b receives the electrical signals from both second set-up unit 12b and second handle unit 15b.

Figure 7A:
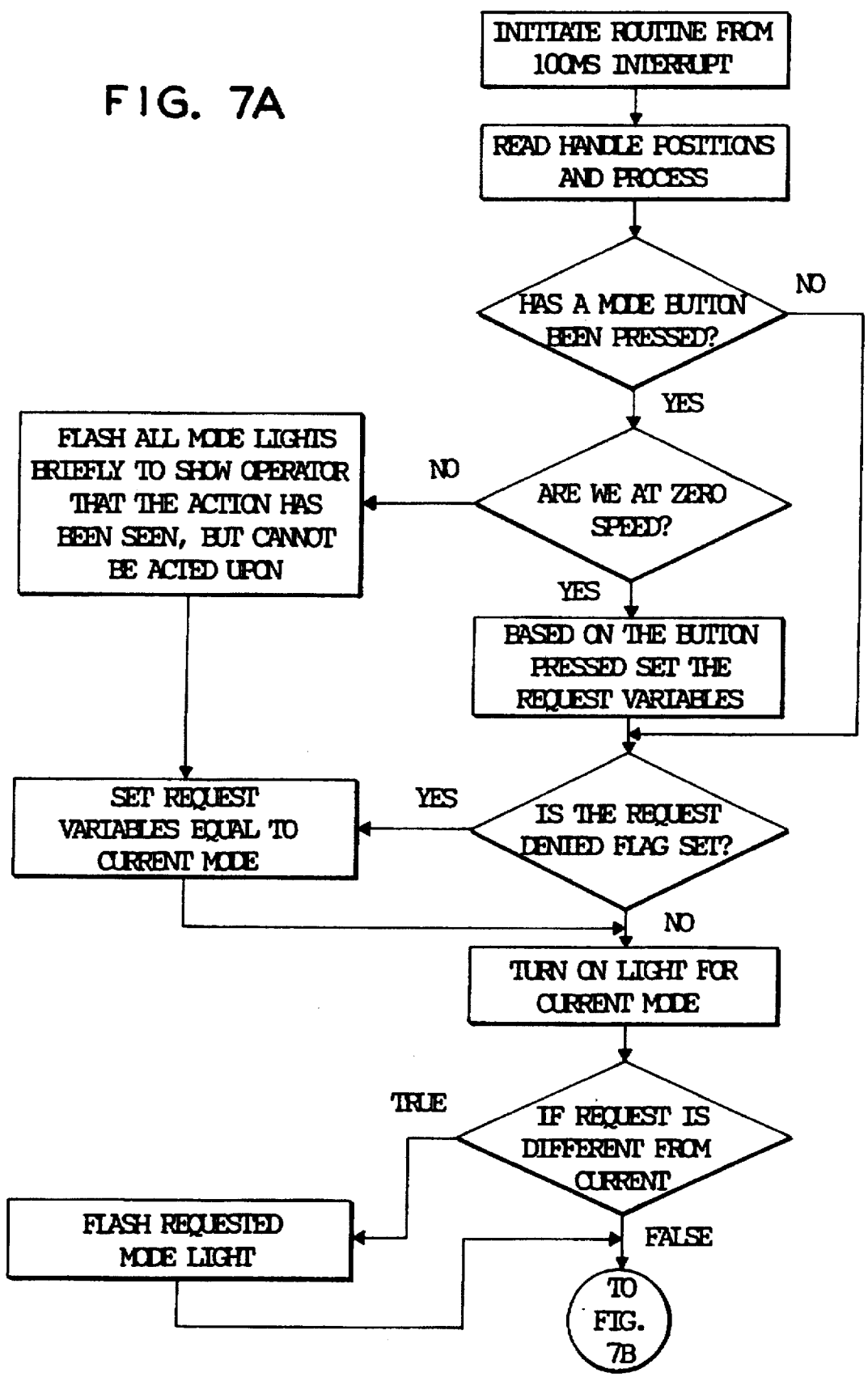
FIG. 7 is a flowchart diagram of the software routines for each cab control unit of the instant invention including routines modified or new to the instant invention represented by shaded blocks.
Figure 7B:
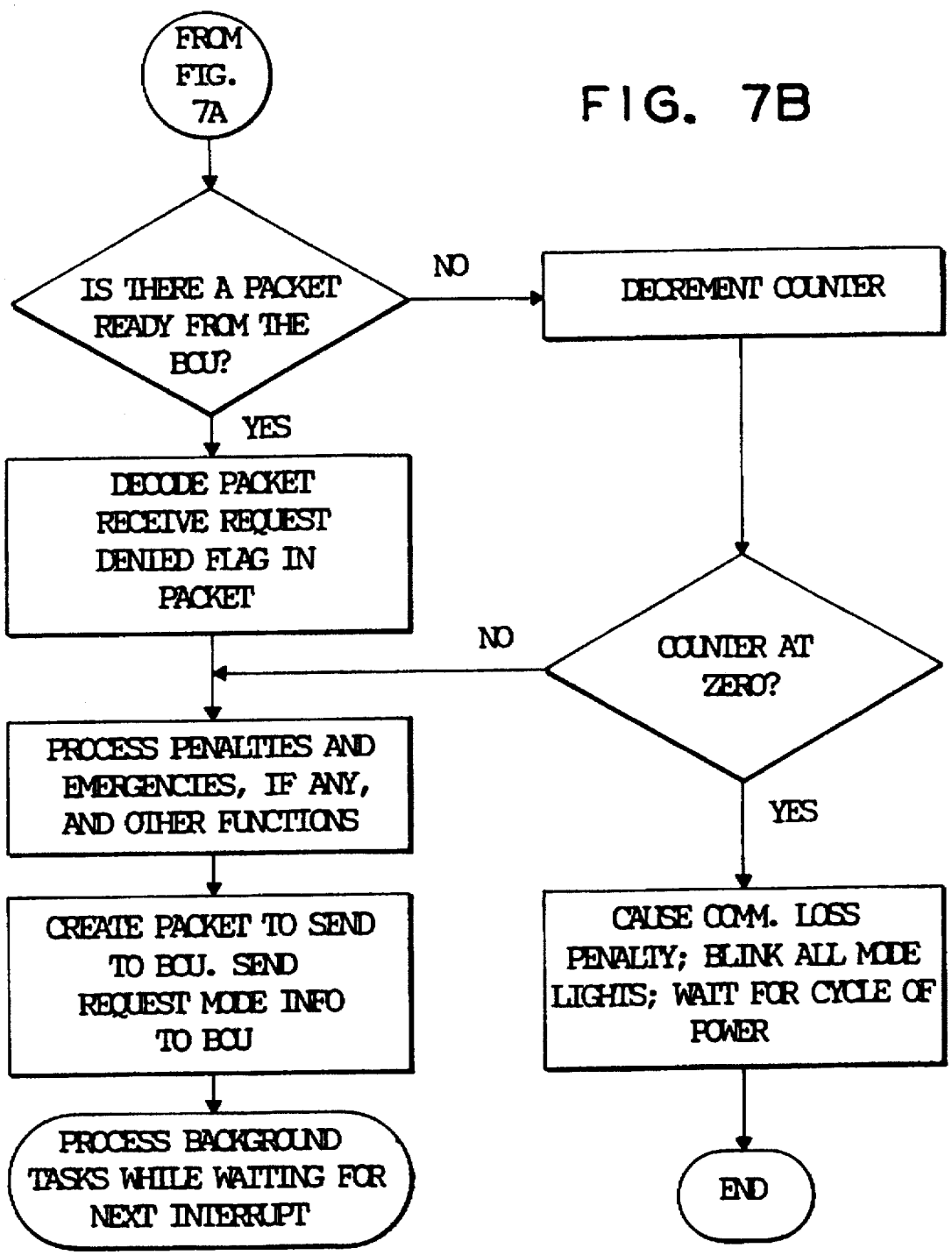

Both of the cab control units 20a,20b contain a cab programming means significantly different than the software contained within cab control unit 120 of the prior art system 100. FIG. 7, features a flowchart diagram of the cab programming means for each cab control unit 20a,20b of the instant invention 1 including software subroutines substantially modified or new to the instant invention 1 represented by shaded blocks. Each cab control unit 20a,20b through its respective cab programming means continuously executes, among other functions, a 100 ms cab control loop in which it performs the various operations necessary to create and send each signal packet. For example, during this cab control loop, each cab I/O card 22a,22b of FIG. 2 receives from its respective handle unit 15a,15b through a cable 8a,8b the electrical signals representing the positions of the automatic 13a,13b and independent 14a,14b brake handles. Also during this cab control loop, each cab I/O card 22a,22b receives from its respective set-up unit 12a,12b through cable 8a,8b the electrical signals representing the requests for LEAD CUT-IN, LEAD CUT-OUT and TRAIL mode of operation. Like the prior art system 100, however, each cab control unit 20a,20b also receives electrical input signals representing other desired operating parameters. Each cab I/O card 22a,22b converts these electrical signals into digital code and sends the digital code via its corresponding base port 23a,23b to the corresponding cab CPU board 21a,21b. For every one of its cab control loops, each cab CPU board 21a,21b generates, from these converted input signals and others, one signal packet indicative of the aforementioned operating parameters. Through its respective comm ports 24a,24b, each cab CPU board 21a,21b continuously communicates its signal packets, one for each control cycle, to brake control unit 3. Based on the signal packets received via each of the comm channels 4a,4b and on various other inputs, brake control unit 3 controls the operation of the train brakes as hereinafter described.

Each signal packet generated by cab control units 20a,20b constitutes a series of bytes which collectively represent the various input parameters used to direct control of the train brakes through the double ended locomotive. In one signal packet, each cab control unit 20a,20b sends to brake control unit 3: four bytes representing the positions of the automatic (two bytes) and independent (two bytes) brake handles 13,14; two bytes representing the feedvalve setting; one byte representing the number of locomotives in the locomotive consist; and one or more status bytes. The status bytes include at least one bit for the emergency position of the appropriate automatic brake handle 13a,13b and various other bits representing various penalty inputs and other operating conditions.

The status bytes also include current mode bits and request mode bits. The current mode bits indicate the mode in which each cab control unit 20a,20b is set and in which each cab station unit 2a,2b, respectively, is currently operating. Occupying the same position in the status bytes as the current mode bits, the request mode bits indicate a request for a change in the operating mode. While each cab station units 2a,2b respectively operates in one of its modes, their corresponding cab control units 20a,20b respectively send to brake control unit 3 within each signal packet the current mode bits. When a change in mode is requested via any of the mode switches 60,61,62 of set-up units 12a,12b, the corresponding cab control unit 20a,20b transmits to brake control unit 3 within each signal packet the request mode bits. Because they occupy the same position in the status bytes, the current mode bits and the request mode bits (both hereinafter also referred to as "check bits") of each respective cab control unit 20a,20b are alterably indicative of either the mode in which each corresponding cab station unit 2a,2b is currently set or the mode which a train operator may request through any of the switches 60,61,62 of the corresponding cab station unit 2a,2b. Brake control unit 3 grants or denies such requests based on criteria set forth hereinafter.

Referring still to FIG. 2, brake control unit 3 includes a brake CPU board 31 and at least one brake I/O card (not shown) interconnected to brake CPU board 31 and to pneumatic operating unit 6 and locomotive interface unit 7. Brake CPU board 31 includes a third comm port 34 and a fourth comm port 35. Like the first and second comm ports 24a,24b of cab CPU boards 21a,21b, the third and fourth comm ports 34,35 are preferably asynchronous RS-232 serial ports. Through a channel 44a, cab control unit 20a via first comm port 24a continuously communicates signal packets in the form of a first stream of signal packets to third comm port 34 of brake CPU board 31. Likewise, through a channel 44b, cab control unit 20b via second comm port 24b continuously communicates signal packets in the form of a second stream of signal packets to fourth comm port 35 of brake CPU board 31. The signal packets in each of the first and second signal streams have the same format, but may contain different data. Through the brake I/O card(s), brake CPU 31 board receives various other inputs from, and transmits various outputs to, both pneumatic operating unit 6 and locomotive interface unit 7 as alluded to previously. Simply stated, it is through the first and second signal streams and the various other inputs that brake control unit 3 ultimately controls the operation of the train brakes. This configuration can be referred to as a brake control means.

Figure 8:
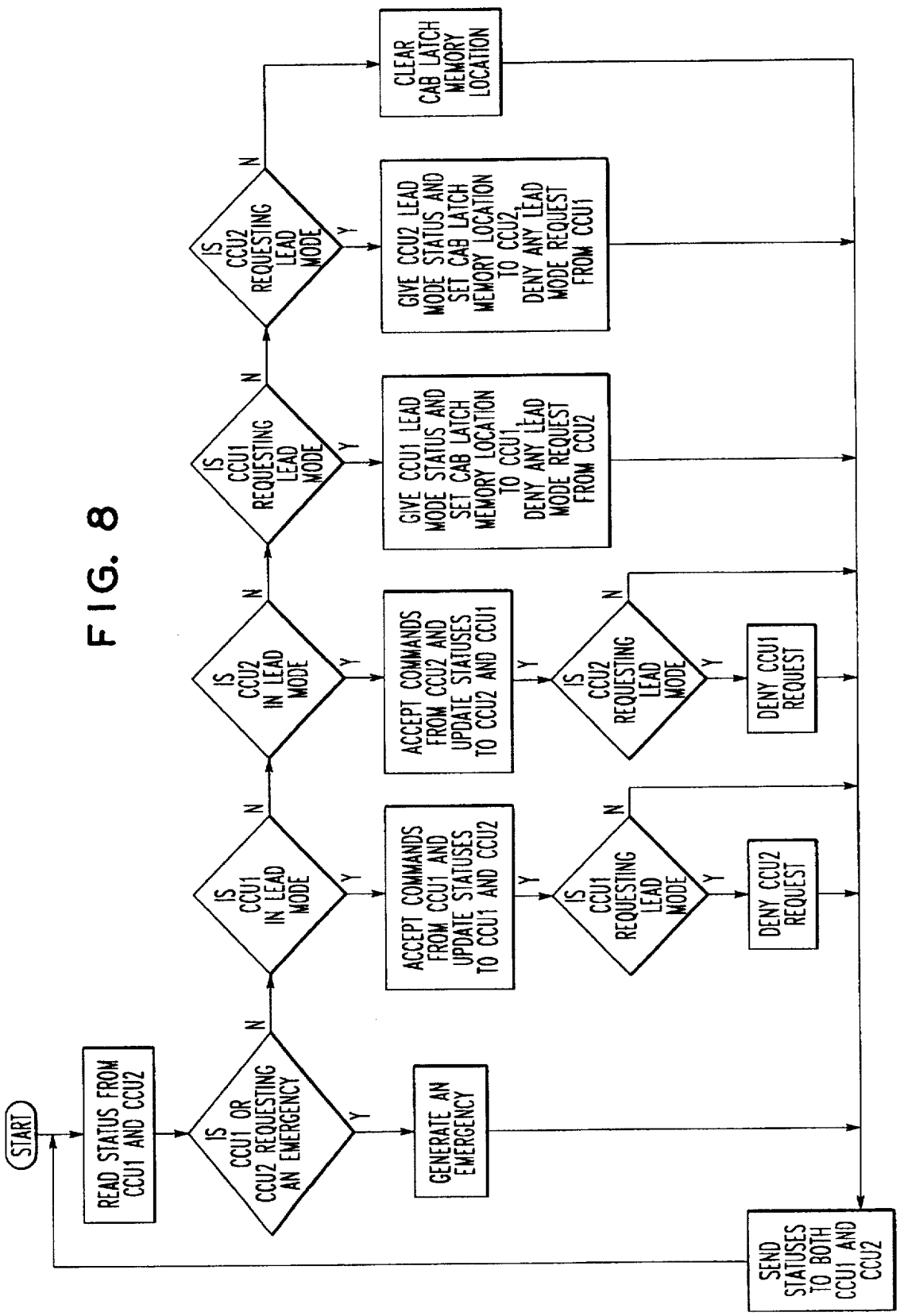
FIG. 8 is a flowchart diagram of the software routines for a brake control unit of the instant invention including routines modified or new to the instant invention represented by shaded blocks.

Brake control unit 3 contains a brake programming means significantly different than the software contained within brake control unit 103 of the prior art system 100. FIG. 8 features a flowchart diagram of the brake programming means for brake control unit 3 of the instant invention 1 including software routines substantially modified or new to the instant invention 1 represented by shaded blocks. Brake control unit 3 through its brake programming means executes, among other functions, a 70 ms brake control loop in which it performs the various operations necessary to control operation of the train brakes. These operations include decoding each signal packet within both the first stream of signal packets received from cab control unit 20a and the second stream of signal packets received from cab control unit 20b. These operation also include reading input from various pressure sensors such as a brake pipe sensor, an equalization reservoir sensor, and a brake cylinder sensor. These operations further include controlling various magnet valves such as a brake application magnet valve and a brake release magnet valve in response to the various inputs.

Unlike the prior art system 100, through the brake programming means, brake CPU board 31 of brake control unit 3 determines which, if either, of the cab station units 2a,2b will direct control of the train brakes through the double ended locomotive. Brake CPU board 31 accomplishes this by checking the check bits in each signal packet received from cab station units 2a,2b and acting thereon according to the following basic rules. Brake CPU board 31 denies all requests for a change in mode received from either set-up unit 12a,12b if the double ended locomotive is operating at a speed other than zero. Brake CPU board 31 prevents both set-up units 12a,12b from being simultaneously set in any of the LEAD modes; i.e., at least one of the set-up units 12a,12b must be set in the TRAIL mode any given time. If both of the set-up units 12a,12b are set in the TRAIL mode and then both request any one of the LEAD modes, brake CPU board 31 selects an earliest of the set-up units 12a,12b to so request to direct control of the train brakes; the request of the latter set-up unit to so request is denied thereby leaving the latter set-up unit set in the TRAIL mode. With one set-up unit set in the TRAIL mode, if the other set-up unit set in one of the LEAD modes requests the TRAIL mode, brake CPU board 31 grants the request of the other set-up unit thereby permitting both set-up units to be set in the TRAIL mode. According to the these basic rules as flowcharted in FIG. 8, brake CPU board 31 through the brake programming means selects the cab station unit (2a or 2b) that will direct control of the train brakes. Brake control unit 3 then controls the operation of the train brakes in response to the stream of signal packets corresponding to the cab station unit so selected.

Regarding the check bits that each cab control unit 20a,20b sends to brake control unit 3 in each signal packet, brake control unit 3 for every 70 ms brake control loop echoes the check bits back their corresponding cab control unit 20a,20b. This echoing of the check bits serves in part to answer the requests received from each cab station unit 2a,2b. (For this reason, the check bits echoed by brake control unit 3 are hereinafter referred to as answer bits and, in FIG. 7, as a "request denied flag.")

The contents of the answer bits depends upon whether brake control unit 3 grants or denies a request for a change in mode. When granted, brake CPU board 31 echoes the request mode bits as the answer bits to inform the corresponding cab control unit 20a,20b that its request for change in mode was granted. In response, the corresponding cab control unit 20a,20b continues to send the same check bits to brake CPU board 31 because the check bits are now representative of the current operating mode (i.e., the current mode bits now equal the request mode bits). Brake control unit 3 thereafter echoes the same check bits until the corresponding cab station unit 2a,2b again requests and brake control unit 3 grants another change in mode. When denied, brake CPU board 31 echoes the current mode bits as the answer bits to inform the corresponding cab control unit 20a,20b that its request was denied. In response, the corresponding cab control unit 20a,20b stops sending the same check bits to brake CPU board 31 because those check bits are representative of the request that was denied. Consequently, through the answer bits, brake CPU board 31 commands the corresponding cab CPU board 24a,24b to reset its check bits to reflect the mode in which it was set prior to the request (i.e., the current mode bits remain the current mode bits). Brake control unit 3 thereafter echoes the same answer bits until the corresponding cab station unit 2a,2b again requests and brake control unit 3 grants another change in mode.

The echoing of the check bits can perhaps be best explained by the following example. Assume that the two bit binary code 00 is indicative of the TRAIL mode, 01 is indicative of the LEAD CUT-IN mode and 10 is indicative of the LEAD CUT-OUT mode. Assume also that the speed of the double ended locomotive is zero. Assume further that cab station unit 2a is set in the TRAIL mode and cab station unit 2b is set in the LEAD CUT-IN mode. The check (i.e., current mode) bits for cab station unit 2a are 00 and for cab station unit 2b are 01. Through switch 61a of FIG. 2, cab station unit 2a requests a change to the LEAD CUT-OUT mode in which case cab control unit 20a stores its current mode bits 00 in memory and changes its check bits to equal the request mode bits 10. During their respective software control loops, brake CPU board 31 and cab CPU board 21b send back and forth the same check bits 01. Meanwhile, cab CPU board 21a sends its check (i.e., request mode) bits 10 to brake CPU board 31. Because cab station unit 2b is set in the LEAD CUT-IN mode and therefore directs control of the locomotive brakes, brake control unit 3 must deny the request received from cab station unit 2a according to the aforementioned basic rules. Consequently, brake CPU board 31 echoes to cab CPU board 21a the answer bits 00 thereby ordering cab CPU board 21a to reset its check bits from its request mode bits 10 to its current mode bits 00 stored in memory. Cab CPU board 21a thereafter transmits 00 as its check bits until another request for a change in mode is made through switches 60a,61a,62a of set-up unit 12a. This transmission of commands or data from brake control unit 3 to the cab control units 20a,20b is unique to the present system 1.

It should be noted that the signal packets in each of the first and second signal streams and the check bits echoed by brake control unit 3 undergo CRC checking (Cyclic Redundancy Checking) or like verification testing between the respective cab control units 20a,20b and brake control unit 3. Furthermore, if the information within any given signal packet or any given check bits message is determined to be corrupt, the present system 1 issues a diagnostic code.

Figure 6:
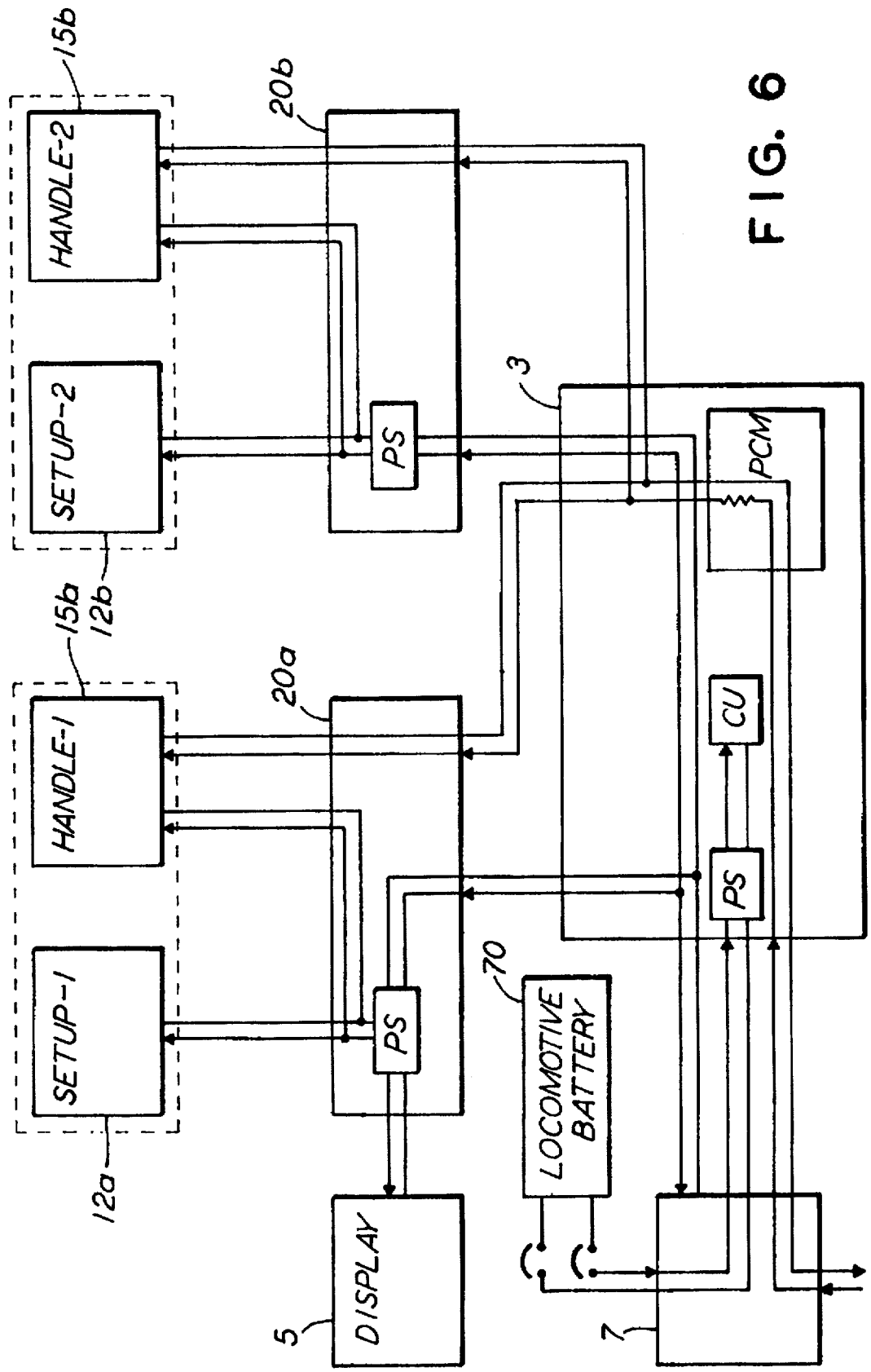
FIG. 6 is a wiring diagram of the instant electronic brake control system for a double ended locomotive showing how electrical power is supplied to and regulated by the instant system and distributed to each component therein.

FIG. 6 illustrates that the present system 1 receives electrical power during normal operation through a battery 70 within the double ended locomotive. The power is initially routed through locomotive interface unit 7 to brake control unit 3 where the voltage is stepped down, regulated and distributed to other components of the instant system 1 including each cab control unit 20a,20b. Each cab control units 20a,20b likewise steps down, regulates and distributes the voltage to its corresponding set-up unit 12a,12b and handle unit 15a,15b. If the instant system 1 loses battery power, however, it shuts itself down and switches to backup power circuitry represented by a power line 13T and a return line 4T. While operating in this pneumatic backup mode, various emergency and bail off functions are available from the automatic 13a,13b and independent 14a,14b brake handles of handle units 15a,15b. Except for being implemented on two cab station units 2a and 2b, the backup circuitry of the present system 1 is essentially identical to the backup circuitry of prior art system 100.

The present invention 1 may optionally include a visual indicator (not shown) for each of the mode switches 60,61, 62 of the set-up units 12a and 12b as shown in FIG. 3. Each visual indicator may also be physically incorporated within the particular mode switch to which it corresponds. Through the respective cab I/O cards 22a,22b of FIG. 2, each cab control unit 20a,20b communicates with its corresponding set-up unit 12a,12b to control illumination and deillumination of the visual indicators.

The visual indicators would function according to the following fundamental rules for each cab station unit 2a,2b. In whichever mode the cab station unit is currently operating, the indicator corresponding to that mode continuously illuminates. If the double ended locomotive is operating at a speed other than zero when a request for a change in mode of operation is made, the visual indicator corresponding to the requested mode momentarily flashes and thereafter remains deilluminated. This signifies to the train operator that the request was denied by brake control unit 3. When the double ended locomotive is operating at a speed of zero, the remaining fundamental rules apply. When any given mode switch 60,61,62 is initially pressed so as to request a mode of operation, the indicator corresponding thereto will blink until brake control unit 3 grants or denies the request. While brake control unit 3 determines whether to grant or deny the pending request, however, the indicator corresponding to the current mode of operation stays illuminated. If the request is granted, the corresponding cab control unit (20a or 20b) turns off the indicator corresponding to the previous mode of operation and continuously illuminates the blinking indicator corresponding to the newly granted mode of operation. Conversely, if the request is denied, the corresponding cab control unit (20a or 20b) turns off the blinking indicator corresponding to the requested mode of operation. The indicator corresponding to the current operating mode then remains illuminated. Independent of the speed of the double ended locomotive, if communication ceases between brake control unit 3 and either or both of cab control units 20a,20b, all three visual indicators corresponding to the affected cab station unit will blink until power is recycled.

Another optional addition to the instant system 1 is a means for enhancing communication between brake control unit 3 and each of the cab control units 20a,20b. As is well known in the communication art, signal quality generally declines as either the ambient noise level or the distance or both increase between transmitter and receiver. Within a double ended locomotive, there are several sources of electromagnetic noise and the distance between brake control unit 3 and each cab control unit 20a,20b may extend to 70 feet or more. One way to improve the quality of binary signal transmission between brake control unit 3 and each cab control unit 20a,20b is through use of the communication enhancing means.

Figure 5:
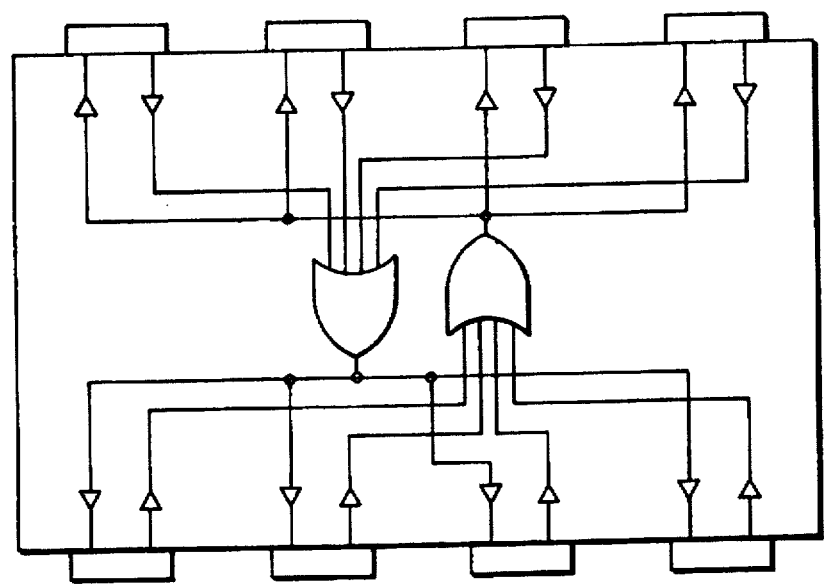
FIG. 5 is a schematic logic diagram of a communication converter unit which is the essential component of the communication enhancing circuitry shown in FIG. 4.

Unique to the present system 1, the communication enhancing means includes four communication converter units such as the one illustrated in FIG. 5. The communication converter unit is bidirectional. It is designed to convert from any one of an RS-232 signal, an RS-422 signal, an RS-485 signal or an optical signal to any of an optical signal, RS-485 signal, RS-422 signal or RS-232 signal. The converter unit is strictly a signal converter and does not modify the contents of the signal packets or the check bits in any way. FIG. 5 shows that a signal input to any one port is converted to a "common" signal and then reconverted to each of the four signal types. Though only one input port can be used at any one time, all output ports are available at the same time. If more than one input is used at any one time, there may be a conflict.

Figure 4:
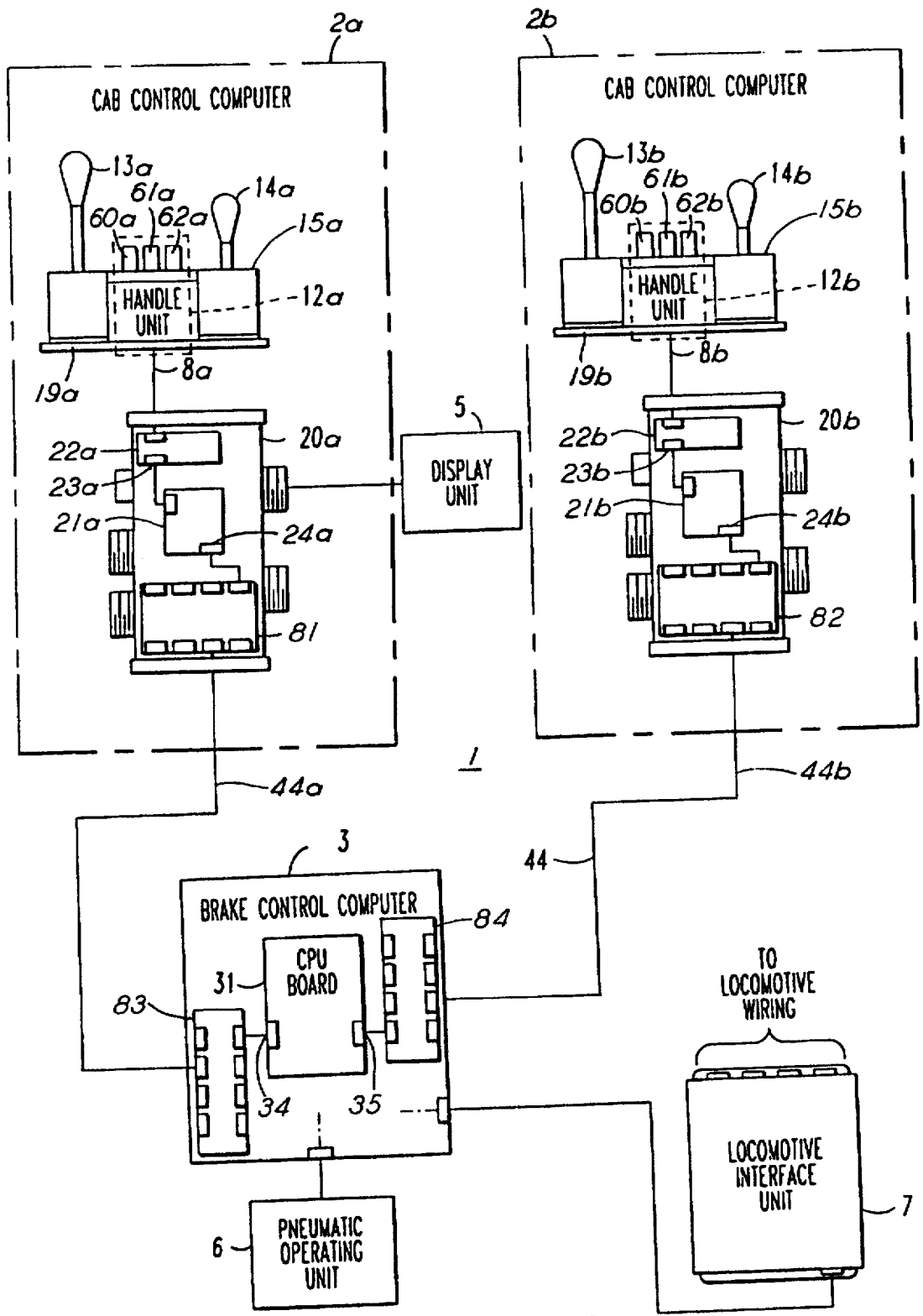
FIG. 4 is a schematic block diagram of the instant electronic brake control system for a double ended locomotive including communication enhancing circuitry disposed within each of two cab station units and a brake control unit.

The four communication converter units may be arranged within the instant system 1 as illustrated in FIG. 4. A first communication converter unit 81 is disposed within cab control unit 20a and is connected in series with a third communication converter unit 83 disposed within brake control unit 3. The first stream of signal packets communicates from cab CPU board 21a through first communication converter unit 81 through channel 44a and third communication converter unit 83 to third comm port 34 of brake CPU board 31. The check bits destined to cab control unit 20a from brake control unit 3 communicate in the reverse direction. A second communication converter unit 82 is disposed within cab control unit 20b and is connected in series with a fourth communication converter unit 84 disposed within brake control unit 3. The second stream of signal packets communicates from cab CPU board 21b through second communication converter unit 82 through channel 44b and fourth communication converter unit 84 to fourth comm port 35 of brake CPU board 31. The check bits destined to cab control unit 20b from brake control unit 3 communicate in the reverse direction.

Each of the communication converter units need not be physically housed within any of the enumerated components. They need only be located in proximity to the enumerated components so as to improve the quality of communication between brake control unit 3 and each cab control unit 20a,20b. Close inspection of FIGS. 4 and 5 reveal that the signals between the cab CPU boards 21a,21b and the corresponding converter units 81,82 are of the RS-232 type as are those between the brake CPU board 31 and the converter units 83,84. The signals between converter units 81,82 and converter units 83,84, respectively, however, are of the RS-422 type. This is just one possible arrangement through which the quality of communication between brake control unit 3 and each cab control unit 20a,20b is improved. The signal to noise ratio of RS-422 transmission over long communication links is better than that of RS-232 transmission.

The software of the present double ended locomotive brake control system 1 controls several other facets of operation of the instant system 1. Regarding operations when power is first applied to the present system 1, through the brake programming means brake control unit 3 transmits initial settings for various operating parameters. For example, like prior art system 100 brake control unit 3 provides initial pneumatic pressure settings and software flags. Unique to the instant system 1, however, brake control unit 3 also transmits to each cab station unit 2a,2b the check bits for the TRAIL mode of operation. Brake control unit 3 waits for a prespecified time period (e.g., approximately 4 seconds) after power is applied to the present system 1 to receive a stream of signal packets from any one of the cab station units 2a,2b. If communication is not received from either cab station unit 2a,2b within the prespecified period, the instant system 1 initiates a communications loss penalty. If, however, communication is received from only one cab station unit within the prespecified period, brake control unit 3 waits an additional prespecified time period to receive signal packets from the other cab station unit. If communication is not received from the other cab station unit within the additional prespecified period, the instant system 1 issues a diagnostic code.

Referring still to when power is first applied to the present system 1, each cab control unit 20a,20b through its cab programming means is automatically set into the TRAIL mode of operation. Thereafter, each cab control unit 20a,20b waits for a predetermined time period (e.g., approximately 7 seconds) to receive its corresponding check bits from brake control unit 3. If brake control unit 3 fails to transmit the check bits to the corresponding cab control units 20a,20b within the predetermined period, the instant system 1 initiates a communications loss penalty.

The software of the present double ended locomotive brake control system 1 likewise controls other operations of the instant system 1 after power has been applied. For example, if the reverser handles are not centered and each cab station unit 2a,2b is set in the TRAIL mode, the present system 1 sets the particular cab station unit in which the reverser handle is moved to the LEAD CUT-OUT mode of operation. This prevents loading of the locomotive traction motor while the train brakes are released. Regarding the automatic brake handles 13a,13b, if either is moved into the emergency position the instant system 1, like prior art system 100 exhausts brake pipe pressure to atmosphere through the two emergency magnet valves at an emergency rate so as to apply quickly and fully the train brakes. Regarding brake control unit 3, if communication is lost from both cab station units 2a,2b during normal operation, the instant system 1 initiates a communications loss penalty. If communication is lost from one cab station unit while the other is operating in the TRAIL mode, the instant system 1 initiates a communications loss penalty. If communication is lost from one cab station unit while the other is operating in either of the LEAD modes, the instant system 1 issues a diagnostic code. As with other diagnostic codes, this error code is retrievable from display 5 illustrated in FIGS. 2 and 4.

Display 5 may be used to apprise the train operator about various information concerning the operation of the instant system 1 including the aforementioned operating parameters and diagnostic codes. Additionally, display 5 may also be used to convey various messages and other useful information including a help guide to assist the train operator with the initial set-up of the instant system 1. Though display 5 can be chosen from any number of commercially available systems, it is sufficient for the instant invention that it consist of a 6 line by 40 character, vacuum fluorescent, alphanumeric display. As with prior art system 100 display 5 may house within the same enclosure a multibutton keypad for entering certain data into the brake control system 1. Optionally, display 5 may also be equipped with a communications port through which diagnostic data and other information may be downloaded to a remote computer such as a laptop computer. Note, however, that brake control unit 3 or one of the cab control units 20a,20b may also be selected to provide this interface.

Given this disclosure including the software flowcharts of FIGS. 7 and 8, it should be apparent to persons skilled in the brake control system art how to practice the present invention including writing each of the software subroutines and functions of the cab and brake programming means represented by the unshaded and shaded blocks of FIGS. 7 and 8.

While the presently preferred embodiment for carrying out the instant invention has been set forth in detail according to the Patent Act, those persons skilled in the brake control system art to which this invention pertains will recognize various alternative ways of practicing the invention without departing from the spirit and scope of the appended claims.

Accordingly, to promote the progress of science and useful arts, we secure for ourselves by Letters Patent exclusive rights to all subject matter embraced by the following claims for the time prescribed by the Patent Act.

We claim:

1. A system for electronically controlling brakes on a train through a double ended locomotive, said system comprising:
    (a) a first cab station means for generating a first stream of signal packets indicative of parameters for operating said system;
    (b) a second cab station means for generating a second stream of signal packets indicative of parameters for operating said system; and
    (c) a brake control means, communicating with said first and said second cab station means, for selecting which one of said cab station means will direct control of such brakes and for controlling operation of such brakes in response to at least said stream of signal packets corresponding to said cab station means so selected.

2. The system for electronically controlling brakes on a train through a double ended locomotive as recited in claim 1 wherein:
    (a) said first cab station means includes a first set-up unit, a first handle unit and a first cab control unit wherein
        (i) said first set-up unit has
            a) a LEAD CUT-IN switch such that when pressed an electrical signal representing a request for a LEAD CUT-IN mode of operation is generated,
            b) a LEAD CUT-OUT switch such that when pressed an electrical signal representing a request for a LEAD CUT-OUT mode of operation is generated, and
            c) a TRAIL switch such that when pressed an electrical signal representing a request for a TRAIL mode of operation is generated,
        (ii) said first handle unit has an automatic brake handle and an independent brake handle through which electrical signals representing position of said automatic brake handle and position of said independent brake handle, respectively, are generated, and
(iii) said first cab control unit has a first I/O card and a first CPU board wherein
a) said first cab I/O card receives said electrical signals from both said first set-up unit and said first handle unit, and
b) said first CPU board generates said first stream of signal packets at least in part from said electrical signals generated by said first set-up unit and said first handle unit and for communicating said first stream of signal packets to said brake control means;
(b) said second cab station means includes a second set-up unit, a second handle unit and a second cab control unit wherein
(i) said second set-up unit has
a) a LEAD CUT-IN switch such that when pressed an electrical signal representing a request for said LEAD CUT-IN mode of operation is generated,
b) a LEAD CUT-OUT switch such that when pressed an electrical signal representing a request for said LEAD CUT-OUT mode of operation is generated, and
c) a TRAIL switch such that when pressed an electrical signal representing a request for said TRAIL mode of operation is generated,
(ii) said second handle unit has an automatic brake handle and an independent brake handle through which electrical signals representing position of said automatic brake handle and position of said independent brake handle, respectively, are generated, and
(iii) said second cab control unit has a second I/O card and a second CPU board wherein
a) said second cab I/O card receives said electrical signals from both said second set-up unit and said second handle unit, and
b) said second CPU board generates said second stream of signal packets at least in part from said electrical signals generated by said second set-up unit and said second handle unit and for communicating said second stream of signal packets to said brake control means; and
(c) said brake control means includes a brake CPU board interconnected to both said first and said second cab CPU boards and at least one brake I/O card interconnected to said brake CPU board, said brake CPU board for so selecting which one of said cab station means will direct control of such brakes and for so controlling operation of such brakes through said at least one brake I/O card in response to at least said stream of signal packets corresponding to said cab station means so selected.

3. The system for electronically controlling brakes on a train through a double ended locomotive as recited in claim 2 wherein:
(a) said first and said second cab control units each have a cab programming means through which said cab CPU boards so generate, respectively, said streams of signal packets; and
(b) said brake control means includes a brake programming means through which said brake CPU board so selects which one of said cab station means will direct control of such brakes and so controls operation of such brakes.

4. The system for electronically controlling brakes on a train through a double ended locomotive as recited in claim 3 wherein:
(a) each of said first and said second cab CPU boards generates said stream of signal packets respectively corresponding thereto such that each signal packet contained therein constitutes a plurality of bits including at least one check bit alterably indicative of one of said modes in which said cab station means is currently set and said mode which a train operator may request through any of said switches; and
(b) said brake CPU board so selects which one of said cab station means will direct control of such brakes by checking said at least one check bit in each said signal packet received from said first and said second cab station means, respectively, such that:
(i) said brake CPU board denies all requests for a change in mode received from said set-up units if such double ended locomotive is operating at a speed other than zero;
(ii) said brake CPU board prevents said set-up units from being simultaneously set in any of said LEAD modes;
(iii) if both of said set-up units are set in said TRAIL mode and then both of said set-up units request any one of said LEAD CUT-IN mode and said LEAD CUT-OUT mode, said brake CPU board selects an earliest of said set-up units to so request to direct control of such brakes thereby leaving a latter of said set-up units to so request set in said TRAIL mode; and
(iv) if one of said set-up units is set in said TRAIL mode and then the other of said set-up units set in any one of said LEAD CUT-IN mode and said LEAD CUT-OUT mode requests said TRAIL mode, said brake CPU board grants said request of said other set-up unit thereby permitting both of said set-up units to be set in said TRAIL mode.

5. The system for electronically controlling brakes on a train through a double ended locomotive as recited in claim 4 wherein each time said brake CPU board denies a request for a change in mode, said brake CPU board commands said cab CPU board from which said request was received to reset said at least one check bit to reflect said mode in which said cab station means is currently operating and prior to said request.

6. The system for electronically controlling brakes on a train through a double ended locomotive as recited in claim 3 wherein said first and said second set-up units each include a visual indicator for each of said switches such that:
(a) when such double ended locomotive is operating at a speed other than zero, each said cab control unit ignores a request for a change in mode but commands said visual indicator corresponding to said switch from which said request was initiated to flash momentarily in response thereto; and
(b) when such double ended locomotive is operating at a speed of zero, each said cab control unit upon receiving a request corresponding to one of said switches commands:
(i) said visual indicator corresponding to said one switch to illuminate blinkingly until said brake control means one of grants and denies said request;
(ii) said visual indicator corresponding to said one switch to illuminate continuously if said brake control means grants said request;
(iii) said visual indicators corresponding to said other switches to deilluminate if said brake control means grants said request corresponding to said one switch; and (iv) said visual indicator corresponding to said one switch to deilluminate if said brake control means denies said request.

7. The system for electronically controlling brakes on a train through a double ended locomotive as recited in claim 6 wherein each said visual indicator is incorporated within said switch to which it corresponds.

8. The system for electronically controlling brakes on a train through a double ended locomotive as recited in claim 6 wherein for each said set-up unit all of said visual indicators thereon blinkingly illuminate when there is a loss of communication between said brake control means and said cab control unit to which said set-up unit corresponds and said visual indicators continue to illuminate blinkingly until power to said system is recycled.

9. The system for electronically controlling brakes on a train through a double ended locomotive as recited in claim 2 wherein said cab control units are interchangeable with each other.

10. The system for electronically controlling brakes on a train through a double ended locomotive as recited in claim 2 wherein such train includes a brake pipe and wherein each said automatic brake handle has an emergency position and a cam switch situated thereabout such that for each of said automatic brake handles, if said automatic brake handle is moved to said emergency position, approximately simultaneously:

(a) said brake control means energizes a first emergency magnet valve thereby exhausting pressure at an emergency rate from such brake pipe to atmosphere; and (b) said cam switch closes and power flows therethrough to energize a second emergency magnet valve thereby exhausting pressure at said emergency rate from such brake pipe atmosphere; so that such brakes of such train apply quickly and fully.

11. The system for electronically controlling brakes on a train through a double ended locomotive as recited in claim 2 wherein said system further includes a means for enhancing communication between said brake control means and each said cab control unit.

12. The system for electronically controlling brakes on a train through a double ended locomotive as recited in claim 11 wherein said communication enhancing means includes four communication converter units such that:

(a) a first communication converter unit connected to said first cab CPU board and disposed in proximity to said first cab control unit is connected in series with a third communication converter unit connected to said brake CPU board disposed in proximity to said brake control unit; and (b) a second communication converter unit connected to said second cab CPU board and disposed in proximity to said second cab control unit is connected in series with a fourth communication converter unit connected to said brake CPU board and disposed in proximity to said brake control unit;

so that communications between said brake CPU board and said cab CPU boards are less likely to be adversely affected by electromagnetic noise and other signal loss causing factors.

13. The system for electronically controlling brakes on a train through a double ended locomotive as recited in claim 3 wherein both said first and said second cab station means are set in said TRAIL mode each time power is initially applied to said system.

14. The system for electronically controlling brakes on a train through a double ended locomotive as recited in claim 1 wherein if one of said cab station means fails, said brake control means selects the other of said cab station means to so direct control of such brakes.

15. The system for electronically controlling brakes on a train through a double ended locomotive as recited in claim 1 wherein said system includes at least one display for displaying information pertaining to operation of said system.

16. The system for electronically controlling brakes on a train through a double ended locomotive as recited in claim 15 wherein said display includes an interface unit through which said information may be downloaded to a remote computer.

17. The system for electronically controlling brakes on a train through a double ended locomotive as recited in claim 1 wherein said system performs error checking on communications between said brake control means and each of said cab station means.

18. A cab control unit for use with a system for electronically controlling brakes on a train through a double ended locomotive, said cab control unit comprising:

a) a cab I/O card for receiving electrical signals indicative of position of a brake handle and indicative of a request for a mode of operation of such system; and b) a cab CPU board for generating a stream of signal packets at least in part from such electrical signals received by said cab I/O card and for communicating said stream of signal packets to a means for controlling such brakes and for receiving and processing commands from such brake control means pertaining to whether such request for a change of such mode is granted or denied.

19. A brake control unit for use with a system for electronically controlling brakes on a train through a double ended locomotive, said brake control unit comprising:

(a) a brake CPU board interconnected to a pair of cab control units each of which generates a stream of signal packets indicative of at least a position of a brake handle and a request for a mode of operation of such system; and (b) at least one brake I/O card interconnected to said brake CPU board and through which control of such brakes is effected; wherein said brake CPU board is for selecting which one of such streams of signal packets will be used to direct control of such brakes and for so controlling operation of such brakes through said at least one brake I/O card in response to at least such stream of signal packets so selected.

20. The brake control unit as recited in claim 19 wherein said brake control unit:

(a) checks at least a check bit contained within each signal packet of each such stream of signal packets so as to so determine which of such streams of signal packets will be used to direct control of such brakes; and (b) transmits in response thereto to each such cab control unit respectively corresponding to such streams of signal packets a command as to whether such request for a change of such mode is granted or denied.

* * * * *